J. COYNE.
Railway-Cars.

No. 153,052. Patented July 14, 1874.

WITNESSES:

INVENTOR:
John Coyne
BY

ATTORNEYS.

UNITED STATES PATENT OFFICE.

JOHN COYNE, OF BALTIMORE, MARYLAND.

IMPROVEMENT IN RAILWAY-CARS.

Specification forming part of Letters Patent No. 153,052, dated July 14, 1874; application filed March 16, 1874.

*To all whom it may concern:*

Be it known that I, JOHN COYNE, of Baltimore, Maryland, have invented a new and Improved Railway-Car; and I do hereby declare that the following is a full, clear, and exact description of the same, reference being had to the accompanying drawing forming a part of this specification, in which—

Figure 1:
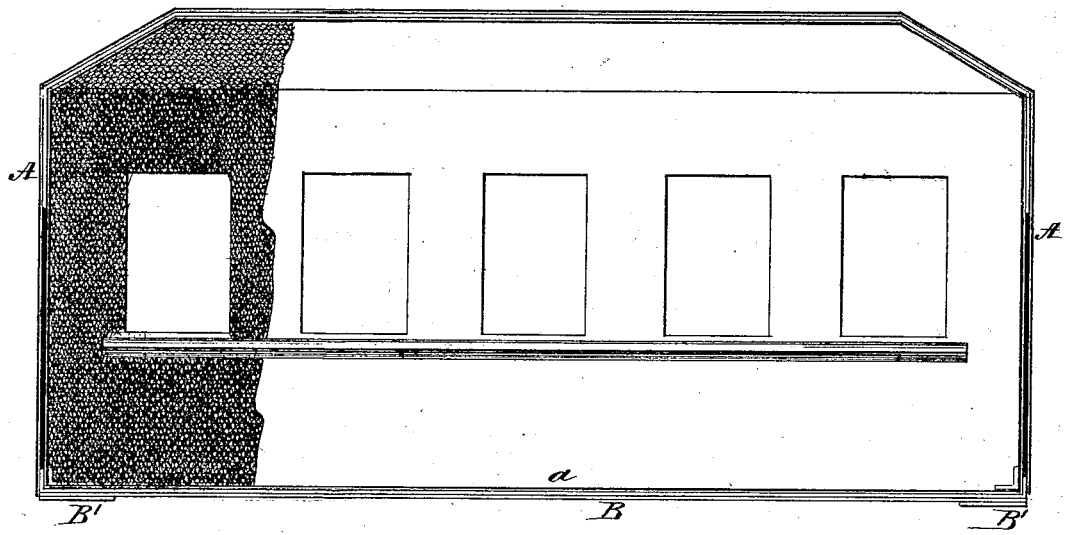
Figure 2:
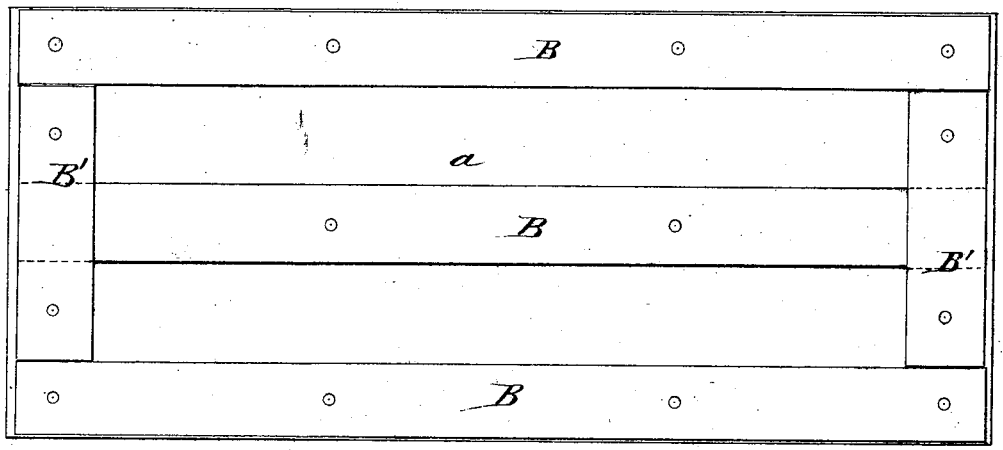

Figure 1 is a side elevation, and Fig. 2 a bottom view.

The invention relates to modes of constructing the frames of railway-cars that are covered, to render them less inflammable and less liable to be splintered and broken into fragments.

Heretofore I have sought to accomplish this by means of a frame of interlacing vertical, horizontal, and longitudinal metallic strips, covered on the inside and outside with rubber or gutta-percha. In practice, I have found that these lace-work frames lack substantial strength to resist the concussive force of many shocks to which cars are subject, the said cars soon becoming racked, impaired, and open to serious objections.

To give durability to cars protected by rubber, and to remove their inflammability and liability to fracture, I construct a car-body as hereinafter fully described, and subsequently claimed.

I make the whole frame of car A of thin sheets of metal riveted together like boiler-plates, and covered on both sides with rubber or gutta-percha. The bottom sheet $a$ is stiffened and re-enforced by longitudinal and transverse plates B B', while the sides and ends are excised to receive the windows and doors. The top is made with the ordinary dome or concavity, and may be provided with the usual ventilators.

Having thus described my invention, what I claim is—

The frame of a car made of thin sheets of metal, riveted together and braced on the bottom by transverse plates, all combined and adapted to receive rubber facings, as shown and described.

JOHN COYNE.

Witnesses:
SOLON C. KEMON,
CHAS. A. PETTIT.